United States Patent
Angilivelil et al.

(10) Patent No.: US 7,319,354 B2
(45) Date of Patent: Jan. 15, 2008

(54) SIGNAL PROCESSING APPARATUS HAVING INTERNAL CLOCK SIGNAL SOURCE

(75) Inventors: Josey George Angilivelil, Sachse, TX (US); Douglas Allen Roberson, Rockwall, TX (US); Stephan H. Lin, Plano, TX (US); Venkateswar Reddy Kowkutla, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 497 days.

(21) Appl. No.: 11/026,654

(22) Filed: Dec. 31, 2004

(65) Prior Publication Data

US 2006/0145730 A1    Jul. 6, 2006

(51) Int. Cl.
*H03K 5/22*    (2006.01)
(52) U.S. Cl. ........................... 327/291; 327/158
(58) Field of Classification Search ........ 327/291–299, 327/149, 153, 158, 161; 331/17, 25; 375/373–376
See application file for complete search history.

(56) References Cited

U.S. PATENT DOCUMENTS 5,969,558 A * 10/1999 Abe ........................... 327/292
7,205,815 B2 * 4/2007 Park ........................... 327/291

* cited by examiner

*Primary Examiner*—Linh My Nguyen
(74) *Attorney, Agent, or Firm*—Wade J. Brady, III; Frederick J. Telecky, Jr.

(57) ABSTRACT

A signal processing apparatus includes: (a) A signal treating unit for effecting signal treating functions to present a treated signal at an output. (b) A clock generator receiving a clock signal and using the clock signal for presenting an internal clock signal for use by the signal treating unit. (c) A clock simulating unit occasionally coupled with at least one of the clock signal and the clock generator provides a simulated clock signal generally similar to the internal clock signal when either of the clock signal or the internal clock signal is interrupted. (d) A control unit coupled with the signal treating unit, at least one of the clock signal input locus and the internal clock generator for selectively coupling one of the internal clock signal and the simulated clock signal for use by the signal treating unit.

20 Claims, 2 Drawing Sheets

SIGNAL PROCESSING APPARATUS HAVING INTERNAL CLOCK SIGNAL SOURCE

BACKGROUND OF THE INVENTION

The present invention is directed to signal processing apparatuses, and especially to structures and methods for providing clock signaling for operating signal processing apparatuses.

Operation of many signal processing apparatuses, such as audio processing chips, involves responding to a system controller. There are occasions when the system controller effects shutting down or interrupting receipt of an external clock signal, sometimes referred to as a master clock signal. By way of example and not by way of limitation, in an audio processing chip used in connection with a compact disc (CD) player the master clock signal is shut down or interrupted when the player is not engaged in playing a CD, during initial powering up of the audio processing chip, when a user changes a CD or when an automatic CD changer changes a CD, when moving the reader head from track to track, and in other operational situations. There are times when the master clock is shut down or interrupted during which communications or other operations must be carried out, so there is a need for a clock signal for effecting those communications or other operations. Prior art signal processing apparatuses have addressed this need for continuing clock signaling by providing an external clock signal source, such as a crystal, for use when the master clock signal is shut down or interrupted.

In today's market the size of products, such as CD layers, is physically shrinking, and the profit margins of such devices are under pressure to be further reduced. In such market conditions, the addition of a crystal to a signal processing apparatus in a product amounts to adding too bulky and too expensive a component.

It would be useful to provide a source for a clocking signal for a signal processing apparatus when its master clock signal is shut down or interrupted that is less expensive and less bulky than a crystal.

SUMMARY OF THE INVENTION

A signal processing apparatus includes: (a) A signal treating unit for effecting signal treating functions to present a treated signal at an output. (b) A clock generator receiving a clock signal and using the clock signal for presenting an internal clock signal for use by the signal treating unit. (c) A clock simulating unit occasionally coupled with at least one of the clock signal and the clock generator provides a simulated clock signal generally similar to the internal clock signal when either of the clock signal or the internal clock signal is interrupted. (d) A control unit coupled with the signal treating unit, at least one of the clock signal input locus and the internal clock generator for selectively coupling one of the internal clock signal and the simulated clock signal for use by the signal treating unit.

In a signal processing apparatus effecting processing of received signals to present output signals related to the received signals, a method for providing a system clocking signal to the signal processing apparatus includes the steps of: (a) in no particular order: (1) providing a clock signal generating unit for receiving an external clock signal at a clock signal input locus; (2) providing a clock signal simulating unit oriented for effecting occasional coupling with at least one of the clock signal input locus and the clock signal generating unit; and (3) providing a control unit coupled with the clock signal generating unit and the clock signal simulating unit; (b) operating the clock signal generating unit to use the external clock signal for presenting a generated clock signal at an internal clock signal locus; (c) operating the clock simulating unit to receive at least one of the external clock signal and the generated clock signal for developing a simulated internal clock signal generally similar to the generated clock signal based on at least one of the external clock signal and the generated clock signal; and (d) operating the control unit to selectively couple one of the generated clock signal and the simulated internal clock signal for use as the system clocking signal.

It is, therefore, an object of the present invention to provide an apparatus and method for providing a source for a clocking signal for a signal processing apparatus when its master clock signal is shut down or interrupted that is less expensive and less bulky than a crystal.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The present invention is preferably embodied in a small circuit fabricated in semiconductor materials. It is also preferred that the present invention is included within the circuitry comprising the signal processor itself. It is most preferred that the present invention be embodied in a digital phase lock loop (DPLL) circuit established integrally with the circuitry comprising its associated signal processing unit.

When the master clock signal is not shut down or interrupted, an internal clock generating unit in the signal processing apparatus produces a generated clock signal based on the master clock signal. The signal processing unit uses the generated clock signal so long as the master clock signal is available. The DPLL is preferably initially coupled to receive the external clock signal and uses the external clock signal to derive a simulated clock signal. When an indication is provided to the system controller that the master clock has been shut down or interrupted, the system controller directs the DPLL to enter into a "limp" mode in which the DPLL continues to provide a constant simulated clock signal based upon its earlier-determined simulated clock signal which was based upon the master clock signal when it was available. The DPLL continues to provide the simulated clock signal and the signal processing unit uses the simulated clock signal for as long as the master clock signal remains shut down or interrupted.

When the system controller receives an indication that the master clock is no longer shut down or interrupted, the DPLL is returned to receiving the master clock signal for purposes of deriving a simulated clock signal and the generated clock signal based upon the master clock signal is again provided as the system clock signal for the signal processing apparatus.

Figure 1:
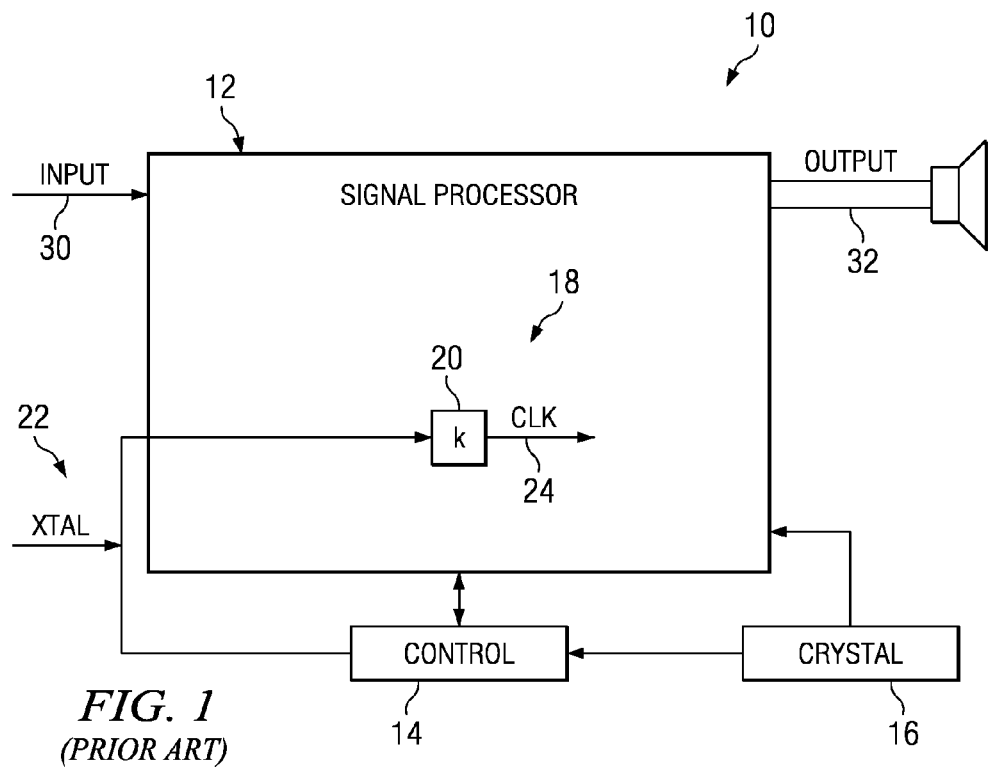
FIG. 1 is an electrical schematic diagram of a representative prior art signal processing apparatus using a crystal for a continuous clock signal source.

FIG. 1 is an electrical schematic diagram of a representative prior art signal processing apparatus using a crystal for a continuous clock signal source. In FIG. 1, a signal processing apparatus 10 includes a signal treating or signal processing unit 12, a control unit 14, a crystal 16 and an internal clock signal generating unit 18. Signal treating unit 12 receives input signals INPUT at an input locus 30, effects a plurality of treating functions on input signals INPUT (not shown in detail in FIG. 1) and presents a treated signal OUTPUT at an output locus 32. One exemplary embodiment of signal treating unit 12 is an audio signal processing unit.

Internal clock generating unit 18 includes a scaling unit 20. An external clock signal or master clock signal XTAL is provided to signal treating unit 12 at a clock signal input locus 22. External clock signal XTAL is provided from clock signal input locus 22 to scaling unit 20. Scaling unit 20 applies a scaling factor k to external clock signal XTAL to provide a generated internal system clock signal CLK at an internal clock signal locus 24.

Signal treating unit 12 responds to control unit 14 in carrying out operations. There are occasions when the control unit 14 effects shutting down or interrupting receipt of external clock signal XTAL. By way of example and not by way of limitation, signal treating unit 12 may be embodied in an audio processing chip used in connection with a compact disc (CD) player (not shown in FIG. 1). In CD player operations, the master clock signal (i.e., external clock signal XTAL) is shut down or interrupted when the player is not engaged in playing a CD, during initial powering up of the audio processing chip (i.e., signal treating unit 12), when a user changes a CD or when an automatic CD changer changes a CD, when moving the player from track to track, and in other operational situations. There are times when the master clock is shut down or interrupted during which communications or other operations must be carried out, so there is a need for a clock signal for effecting those other operations. Crystal 16 addresses this need for continuing clock signaling by operating as an external clock signal source for use when the master clock signal is shut down or interrupted. Control unit 14 is connected to receive external clock signal XTAL and is connected with crystal 16. By such connections, control unit 14 can know when external clock signal XTAL is shut down or interrupted and can cause crystal 16 to provide a clock signal for use by signal treating unit 12.

In today's market the size of products, such as CD layers, is physically shrinking, and the profit margins of such devices are under pressure to be further reduced. In such market conditions, the addition of a crystal to a signal processing apparatus in a product amounts to adding too bulky and too expensive a component.

The present invention provides a source for a clocking signal for a signal processing apparatus when its master clock signal is shut down or interrupted that is less expensive and less bulky than a crystal.

Figure 2:
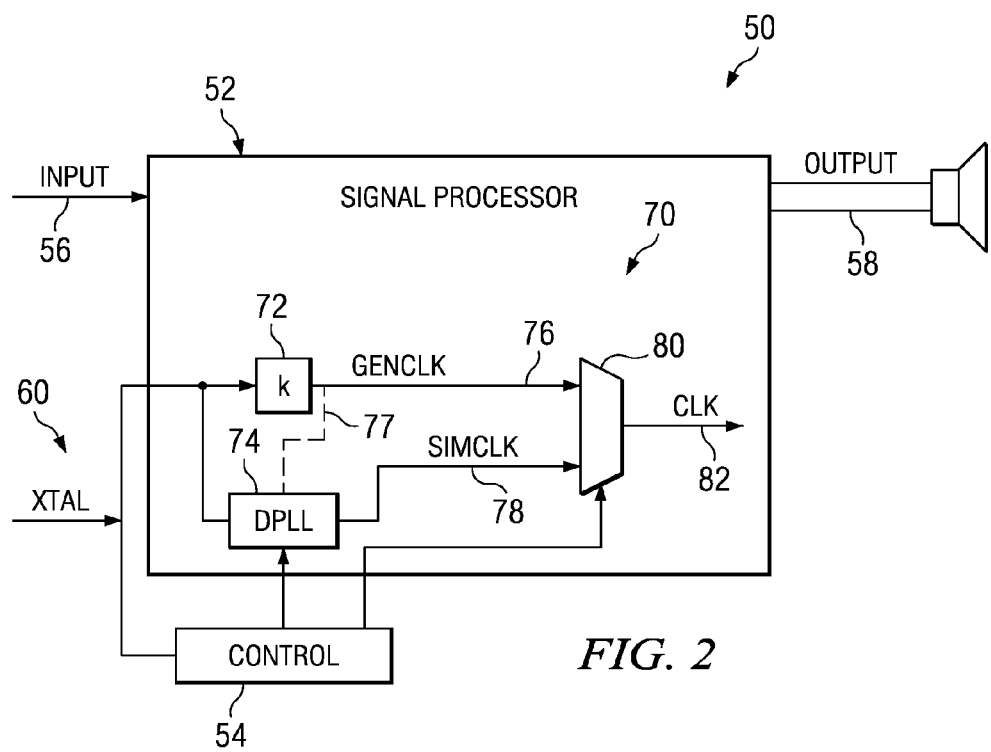
FIG. 2 is an electrical schematic diagram of a preferred embodiment of a signal processing apparatus using the present invention for a continuous clock signal source.

FIG. 2 is an electrical schematic diagram of a preferred embodiment of a signal processing apparatus using the present invention for a continuous clock signal source. In FIG. 2, a signal processing apparatus 50 includes a signal treating or signal processing unit 52, a control unit 54 and an internal clock signal generating unit 70. Signal treating unit 52 receives input signals INPUT at an input locus 56, effects a plurality of treating functions on input signals INPUT (not shown in detail in FIG. 2) and presents a treated signal OUTPUT at an output locus 58. One exemplary embodiment of signal treating unit 52 is an audio signal processing unit.

Internal clock generating unit 70 includes an internal clock generating unit embodied in a scaling unit 72 and a clock signal simulating unit embodied in a digital phase lock loop (DPLL) unit 74. An external clock signal or master clock signal XTAL is provided to signal treating unit 52 at a clock signal input locus 60. External clock signal XTAL is provided from clock signal input locus 60 to scaling unit 72 and to DPLL 74. Scaling unit 72 applies a scaling factor k to external clock signal XTAL to provide a generated internal system clock signal GENCLK via an output line 76 to a multiplexer unit 80. Multiplexer unit 80 is coupled with an internal clock signal locus 82. DPLL 74 uses external clock signal XTAL to derive a simulated clock signal SIMCLK and provides simulated clock signal SIMCLK via an output line 78 to multiplexer unit 80. By way of example and not by way of limitation, DPLL 74 may apply a multiplier or other scaling factor to external clock signal XTAL to derive simulated clock signal SIMCLK. If external clock signal XTAL is provided at 50 MHz, DPLL 74 may multiply XTAL by a factor of three, thus establishing simulated clock signal SIMCLK at 150 MHz. When external clock signal XTAL is provided to DPLL 74, DPLL 74 always tries to track external clock signal XTAL. When DPLL 74 is forced into a "limp" mode—as when external clock signal XTAL is shut down or interrupted—DPLL 74 stops tracking external clock signal XTAL and continues in its then-current state to generate simulated clock signal SIMCLK.

DPLL 74 may instead receive generated clock signal GENCLK or may receive both external clock signal XTAL and generated clock signal GENCLK for use in deriving simulated clock signal SIMCLK. The alternative nature of this arrangement is indicated by a dotted line connection 77 in FIG. 2.

Signal treating unit 52 responds to control unit 54 in carrying out operations. There are occasions when the control unit 54 effects shutting down or interrupting receipt of external clock signal XTAL. By way of example and not by way of limitation, signal treating unit 52 may be embodied in an audio processing chip used in connection with a compact disc (CD) player (not shown in FIG. 2). In CD player operations, the master clock signal (i.e., external clock signal XTAL) is shut down or interrupted when the player is not engaged in playing a CD, during initial powering up of the audio processing chip (i.e., signal treating unit 12), when a user changes a CD or when an automatic CD changer changes a CD, when moving the player from track to track, and in other operational situations. There are times when the master clock is shut down or interrupted during which communications or other operations must be carried out, so there is a need for a clock signal for effecting those other operations.

Control unit 54 is connected to receive external clock signal XTAL and is connected with multiplexer unit 80. By such connections, control unit 54 can know when external clock signal XTAL is shut down or interrupted and can cause multiplexer unit 80 to select simulated clock signal SIMCLK for provision to internal clock signal locus 82 for use by signal treating unit 52. Control unit 54 will cause multiplexer unit 80 to continue providing simulated clock signal SIMCLK to internal clock signal locus 80 until control unit 54 detects that external clock signal XTAL is no longer shut down or interrupted. When control unit 54 detects that external clock signal XTAL is no longer shut down or interrupted, control unit 54 will cause multiplexer unit 80 to provide generated clock signal GENCLK to internal clock signal locus 80. DPLL 74 thus addresses the need for continuing clock signaling by operating as a clock signal source for use when external clock signal XTAL is shut down or interrupted.

Figure 3:
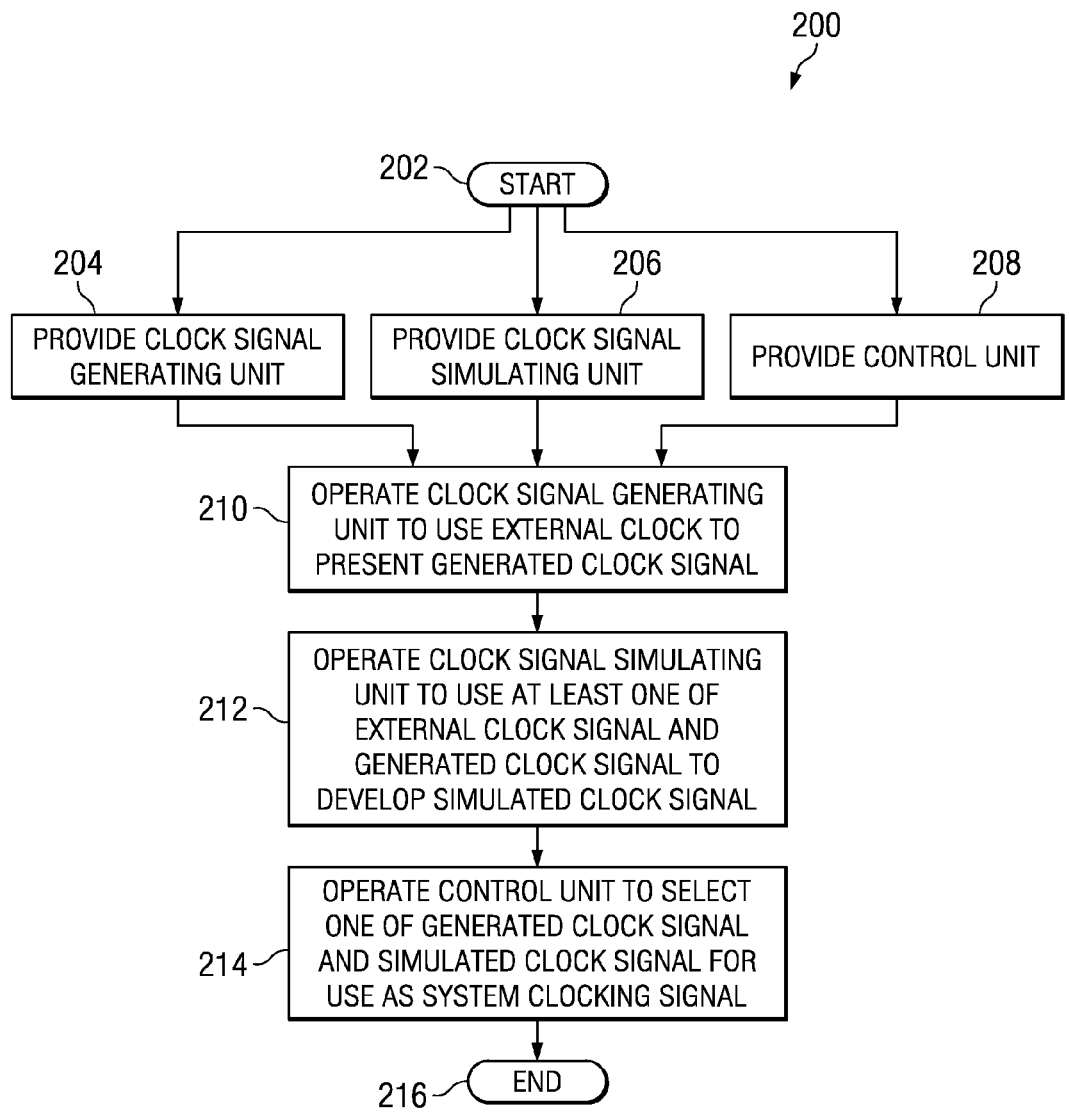
FIG. 3 is a flow diagram illustrating the method of the present invention.

FIG. 3 is a flow diagram illustrating the method of the present invention. In FIG. 3, in a signal processing apparatus (not shown in FIG. 3; see signal treating unit 52; FIG. 2) that effects processing of received signals to present output signals related to the received signals, a method 200 for providing a system clocking signal to the signal processing apparatus begins at a START locus 202.

Method 200 continues with the step of, in no particular order: (1) providing a clock signal generating unit for receiving an external clock signal at a clock signal input locus, as indicated by a block 204; (2) providing a clock signal simulating unit oriented for effecting occasional coupling with at least one of the clock signal input locus and the clock signal generating unit, as indicated by a block 206; and (3) providing a control unit coupled with the clock signal generating unit and the clock signal simulating unit, as indicated by a block 208.

Method 200 continues with the step of operating the clock signal generating unit to use the external clock signal for presenting a generated clock signal at an internal clock signal locus, as indicated by a block 210.

Method 200 continues with the step of operating the clock simulating unit to receive at least one of the external clock signal and the generated clock signal for developing a simulated internal clock signal generally similar to the generated clock signal based on at least one of the external clock signal and the generated clock signal, as indicated by a block 212.

Method 200 continues with the step of operating the control unit to selectively couple one of the generated clock signal and the simulated internal clock signal for use as the system clocking signal, as indicated by a block 214. Method 200 terminates at an END locus 216.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. A signal processing apparatus comprising:
 (a) a signal treating unit receiving an input signal at an input locus; said signal treating unit effecting a plurality of signal treating functions related to said input signal to present a treated signal at an output locus;
 (b) an internal clock signal generating unit receiving an external clock signal at a clock signal input locus; said internal clock signal generating unit using said external clock signal for presenting an internal system clock signal at an internal clock signal locus; said internal clock signal locus being coupled with said signal treating unit; said internal system clock signal being used by said signal treating unit while effecting at least one selected treating function of said plurality of signal treating functions;
 (c) a clock signal simulating unit effecting occasional coupling with at least one of said clock signal input locus and said internal clock signal generating unit to receive at least one of said external clock signal and said internal system clock signal; said clock signal simulating unit providing a simulated internal clock signal generally similar to said internal system clock signal at said internal clock signal locus when either of said external clock signal or said internal system clock signal is interrupted or is decoupled from said internal clock signal locus; and
 (d) a control unit coupled with said signal treating unit, coupled with at least one of said clock signal input locus and said internal clock signal generating unit and coupled with said internal clock signal locus; said control unit operating said internal clock signal locus to selectively couple one of said internal clock signal and said simulated internal clock signal for use by said signal treating unit.

2. A signal processing apparatus as recited in claim 1 wherein said signal treating unit is an audio signal processing unit.

3. A signal processing apparatus as recited in claim 1 wherein said clock signal simulating unit is a digital phase lock loop unit.

4. A signal processing apparatus as recited in claim 1 wherein said internal clock signal locus includes a multiplexer unit; said multiplexer unit receiving said internal clock signal and receiving said simulated internal clock signal; said multiplexer unit responding to said control unit to select one of said internal clock signal and said simulated internal clock signal for use by said signal treating unit.

5. A signal processing apparatus as recited in claim 2 wherein said clock signal simulating unit is a digital phase lock loop unit.

6. A signal processing apparatus as recited in claim 2 wherein said internal clock signal locus includes a multiplexer unit; said multiplexer unit receiving said internal clock signal and receiving said simulated internal clock signal; said multiplexer unit responding to said control unit to select one of said internal clock signal and said simulated internal clock signal for use by said signal treating unit.

7. A signal processing apparatus as recited in claim 3 wherein said internal clock signal locus includes a multiplexer unit; said multiplexer unit receiving said internal clock signal and receiving said simulated internal clock signal; said multiplexer unit responding to said control unit to select one of said internal clock signal and said simulated internal clock signal for use by said signal treating unit.

8. A signal processing apparatus as recited in claim 1 wherein said clock signal simulating unit uses said external clock signal for establishing said simulated internal clock signal during said occasional coupling.

9. A signal processing apparatus as recited in claim 1 wherein said clock signal simulating unit uses said internal system clock signal for establishing said simulated internal clock signal during said occasional coupling.

10. A signal processing apparatus as recited in claim 9 wherein said clock signal simulating unit is a digital phase lock loop unit.

11. A signal processing apparatus as recited in claim 10 wherein said signal treating unit is an audio signal processing unit.

12. In a signal processing apparatus, a system for providing a system clocking signal to said signal processing apparatus; said signal processing apparatus effecting processing of received signals to present output signals related to said received signals; the system comprising:
 (a) a clock signal generating unit receiving an external clock signal at a clock signal input locus; said clock signal generating unit using said external clock signal for presenting a generated clock signal at an internal clock signal locus;

(b) a clock signal simulating unit effecting occasional coupling with at least one of said clock signal input locus and said clock signal generating unit to receive at least one of said external clock signal and said generated clock signal; said clock signal simulating unit developing a simulated internal clock signal generally similar to said generated clock signal based on at least one of said external clock signal and said generated clock signal; and (c) a control unit coupled with said clock signal generating unit and said clock signal simulating unit; said control unit selectively coupling one of said generated clock signal and said simulated internal clock signal for use as said system clocking signal.

13. In a signal processing apparatus, a system for providing a system clocking signal to said signal processing apparatus as recited in claim 12 wherein said clock signal simulating unit is a digital phase lock loop unit.

14. In a signal processing apparatus, a system for providing a system clocking signal to said signal processing apparatus as recited in claim 12 wherein said clock signal simulating unit uses said external clock signal for establishing said simulated internal clock signal during said occasional coupling.

15. In a signal processing apparatus, a system for providing a system clocking signal to said signal processing apparatus as recited in claim 12 wherein said clock signal simulating unit uses said generated system clock signal for establishing said simulated internal clock signal during said occasional coupling.

16. In a signal processing apparatus, a system for providing a system clocking signal to said signal processing apparatus as recited in claim 12 wherein said signal processing apparatus is an audio signal processing apparatus.

17. In a signal processing apparatus, a system for providing a system clocking signal to said signal processing apparatus as recited in claim 13 wherein said clock signal simulating unit uses said external clock signal for establishing said simulated internal clock signal during said occasional coupling.

18. In a signal processing apparatus, a system for providing a system clocking signal to said signal processing apparatus as recited in claim 13 wherein said clock signal simulating unit uses said generated system clock signal for establishing said simulated internal clock signal during said occasional coupling.

19. In a signal processing apparatus, a system for providing a system clocking signal to said signal processing apparatus as recited in claim 13 wherein said signal processing apparatus is an audio signal processing apparatus.

20. In a signal processing apparatus, a method for providing a system clocking signal to said signal processing apparatus; said signal processing apparatus effecting processing of received signals to present output signals related to said received signals; the method comprising the steps of:

(a) providing:
  (1) a clock signal generating unit for receiving an external clock signal at a clock signal input locus;
  (2) a clock signal simulating unit oriented for effecting occasional coupling with at least one of said clock signal input locus and said clock signal generating unit; and
  (3) a control unit coupled with said clock signal generating unit and said clock signal simulating unit;

(b) operating said clock signal generating unit to use said external clock signal for presenting a generated clock signal at an internal clock signal locus;

(c) operating said clock simulating unit to receive at least one of said external clock signal and said generated clock signal for developing a simulated internal clock signal generally similar to said generated clock signal based on at least one of said external clock signal and said generated clock signal; and (d) operating said control unit to selectively couple one of said generated clock signal and said simulated internal clock signal for use as said system clocking signal.

* * * * *